US009582013B2

(12) United States Patent
Naydenov

(10) Patent No.: US 9,582,013 B2
(45) Date of Patent: Feb. 28, 2017

(54) ADDITIVE DELIVERY SYSTEM AND METHOD FOR CONTROLLING SAID SYSTEM

(75) Inventor: Volodia Naydenov, Louvain-la-Neuve (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 252 days.

(21) Appl. No.: 14/119,616

(22) PCT Filed: May 22, 2012

(86) PCT No.: PCT/EP2012/059515
§ 371 (c)(1),
(2), (4) Date: Feb. 24, 2014

(87) PCT Pub. No.: WO2012/160068
PCT Pub. Date: Nov. 29, 2012

(65) Prior Publication Data
US 2014/0174548 A1    Jun. 26, 2014

(30) Foreign Application Priority Data
May 23, 2011  (EP) .................................. 11167158

(51) Int. Cl.
*F16K 49/00*    (2006.01)
*F16L 53/00*    (2006.01)
(Continued)

(52) U.S. Cl.
CPC ............. *G05D 23/20* (2013.01); *F01N 3/208* (2013.01); *F01N 2610/02* (2013.01);
(Continued)

(58) Field of Classification Search
CPC .............. G05D 23/20; Y10T 137/0324; Y10T 137/6606; Y10T 137/6416; F01N 2610/02;
(Continued)

(56) References Cited

U.S. PATENT DOCUMENTS 6,442,932 B1 *    9/2002    Hofmann ........... B01D 53/9431
60/274
2002/0088220 A1    7/2002    Weigl
(Continued)

FOREIGN PATENT DOCUMENTS

CN    101313131 A    11/2008
DE    199 40 298    3/2001
(Continued)

OTHER PUBLICATIONS

Translation of DE 19940298.*
(Continued)

*Primary Examiner* — R. K. Arundale
*Assistant Examiner* — Kelsey Rohman
(74) *Attorney, Agent, or Firm* — Oblon, McClelland, Maier & Neustadt, L.L.P.

(57) ABSTRACT

An additive delivery system including a tank for storing an additive, an active component, and a controller connected to the component, wherein the controller is adapted to determine a value representative of temperature of the additive in the system based on an electrical characteristic of a part inside the component, or inside the controller, wherein the part has a further function next to the temperature estimation function in normal operation of the additive delivery system.

7 Claims, 4 Drawing Sheets

(51) Int. Cl.
*F02B 43/00* (2006.01)
*F02B 47/00* (2006.01)
*F02M 25/00* (2006.01)
*G05D 23/20* (2006.01)
*F01N 3/20* (2006.01)

(52) U.S. Cl.
CPC ...... *F01N 2610/10* (2013.01); *F01N 2610/14* (2013.01); *F01N 2900/1811* (2013.01); *Y02T 10/24* (2013.01); *Y10T 137/0324* (2015.04); *Y10T 137/6416* (2015.04); *Y10T 137/6606* (2015.04)

(58) Field of Classification Search
CPC ......... F01N 2610/10; F01N 2900/1811; F01N 3/208; Y02T 10/24
USPC .......................................... 137/334; 123/1 A
See application file for complete search history.

(56) References Cited

U.S. PATENT DOCUMENTS

| | | |
|---|---|---|
| 2006/0026949 A1 | 2/2006 | Takahata et al. |
| 2007/0163238 A1* | 7/2007 | Gerlach ................ B01D 53/90 60/286 |
| 2009/0126349 A1 | 5/2009 | Shimomura et al. |
| 2010/0064668 A1* | 3/2010 | Beckmann .............. F01N 3/208 60/286 |
| 2010/0242439 A1* | 9/2010 | Domon .............. B01D 53/9431 60/274 |

FOREIGN PATENT DOCUMENTS

| | | |
|---|---|---|
| DE | 10 2007 055032 | 5/2009 |
| EP | 1 538 437 | 6/2005 |
| WO | 01 06098 | 1/2001 |

OTHER PUBLICATIONS

International Search Report Issued Jul. 4, 2012 in PCT/EP12/59515 Filed May 22, 2012.
European Search Report Issued Oct. 6, 2011 in European Application No. 11167158.2 Filed May 23, 2011.
Combined Office Action and Search Report issued Sep. 17, 2015 in Chinese Patent Application No. 201280036605.5 (with English translation of categories of cited documents).
Office Action and Supplemental Search Report issued Apr. 21, 2016 in Chinese Patent Application No. 201280036605.5.

* cited by examiner

ADDITIVE DELIVERY SYSTEM AND METHOD FOR CONTROLLING SAID SYSTEM

The present application relates to an additive delivery system, to a controller for such a system, and to a method for controlling such a system. The invention relates in particular to a SCR system.

Legislation on exhaust emissions of vehicles stipulates, amongst other things, a reduction in the release of nitrogen oxides $NO_x$ into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic decomposition of an ammonia precursor solution, whose concentration may be that of the eutectic. Such an ammonia precursor is generally a urea solution.

With the SCR process, the high levels of $NO_x$ produced in the engine during combustion at optimized efficiency are treated in a catalyst in the exhaust pipe of the engine. This treatment requires the use of the reducing agent of extreme quality at a precise concentration. The solution is thus accurately metered and injected into the exhaust gas stream where it is hydrolysed before converting the nitrogen oxide ($NO_x$) to nitrogen ($N_2$) and water ($H_2O$).

In order to do this, it is necessary to equip the vehicles with a tank containing an additive (generally a urea solution) and also a device for metering the desired amount of additive and injecting it into the exhaust pipe. In general, the SCR device comprises, besides the additive tank, an injector, a pump, and a urea feed line.

In order to be able to correctly meter the additive solution into the exhaust gases, it is known practice to incorporate, into the additive tank, elements such as a level gauge, a temperature sensor, a quality sensor, and one or more resistive heating elements. The heating elements are typically controlled based on the temperature measured by the temperature sensor. In case of failure of the temperature sensor, the one or more heating elements will no longer be controlled correctly, which can have serious consequences for the SCR system e.g. in cases of frost. A solution would be to add a second temperature sensor, but this would require special adoptions of the SCR system and would therefore be expensive.

The object of the present invention is to provide a system, controller and method of the type disclosed in the preamble which allows for a more secure and improved temperature control.

According to the invention, there is provided an additive delivery system comprising a tank for storing an additive, an active component, and a controller connected to the heating element and the component. The controller is adapted to determine a value representative of the temperature of the additive in the system based on an electrical characteristic of a part inside at least one of said component, or said controller. In normal operation, the part preferably has a further function next to the temperature estimation function. In other words, a part of a component with a particular function not related to temperature estimation is given a second function by using an electrical characteristic thereof to determine a value representative of the temperature of the additive in the system. In that way, a part of an existing component like an heating element of an additive delivery system may be used to obtain an estimation of the temperature. Such an estimation may be used in combination with e.g. a measurement by a temperature sensor or in combination with a further estimation based on another existing component or heating element. Hence the system of the invention allows for an improved (and/or cheaper) temperature estimation based on a controlling by the controller.

According to a preferred embodiment, the part is an electrical wire of an active component, which may be an heating element or any other element performing an active function (like measuring a value, dosing the additive etc.). The controller may then be adapted to apply a determined voltage across said wire and to measure a current through said wire. Typically the controller comprises a DC voltage source for applying the voltage across said wire and a current measuring device for measuring the current through said wire. The measured current can then be used as the value representative for the temperature of the additive. Alternatively the controller may be adapted to send a determined current through said wire and to measure a voltage across said wire. In that case, the measured voltage can be used as the value representative for the temperature of the additive. In that case, the controller typically comprises a DC current source for sending a current through said wire and a voltage measuring device for measuring the voltage across said wire.

According to a preferred embodiment, the part is an electrical wire of a coil of a component. In a particular embodiment, the component comprises a pump for supplying additive to an outlet. The pump has an electrical motor (DC motor, BLDC motor, stepper motor) with a coil wire which can be used as the part for which the electrical characteristic is measured by the controller in order to estimate the temperature. The component may further or alternatively comprise a valve having a coil wire forming the part to be measured. In that way, a pump or a valve may not only be used to control the delivery of additive but also to measure a temperature.

According to a further embodiment the part may be a resistive wire of a heating element. The controller may then be adapted to apply a determined voltage over the resistive wire and to measure the current through said resistive wire in order to determine a value representative for the temperature around the heating element, and hence an estimation of the temperature of the additive. In that way a heating element can not only be used to heat the additive but also to measure a temperature.

According to a preferred embodiment, the component comprises any one or more of the following: a component for delivering the additive to an outlet; a sensor element for measuring a parameter of the system, said parameter not being the temperature. The delivery element may consist of one ore more of the following elements: a pump, a dosing device, a valve. The sensor element may consist of one or more of the following elements: a pressure sensor, a level sensor. In the case of a pressure sensor or level sensor, an electrical characteristic measured by such a sensor may be used by the controller to determine whether or not the additive is in a frozen state in addition to determining the pressure/additive level.

According to a preferred embodiment the additive delivery system is an SCR system, in particular for use with urea as the additive. The expression "SCR system" is understood to mean a system for the catalytic reduction of the $NO_x$ from the exhaust gases of an internal combustion engine, preferably of a vehicle, using urea as a liquid ammonia precursor. The term "urea" is understood to mean any, generally aqueous, solution containing urea. The invention gives good results with eutectic water/urea solutions for which there is a quality standard: for example, according to the standard DIN 70070, in the case of the AdBlue® solution (commercial solution of urea), the urea content is between 31.8% and 33.2% (by weight) (i.e. 32.5+/−0.7 wt %), hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. onwards (as opposed to −11° C.), but have the disadvantages of corrosion problems linked to the possible release of formic acid. The present invention is particularly advantageous in the context of eutectic water/urea solutions, but is applicable for any reducing agent that can be used in the SCR system of an engine, and generally relates to any additive delivery system.

As mentioned previously, SCR systems generally comprise at least one tank for storing the urea solution and also a system for feeding this to the exhaust gases, which generally comprises active components such as heater(s), a pump, filter, valve(s), hydraulic lines (feed and/or return lines).

The idea behind the present invention may be combined with the invention of co-pending application EP2008/062183 in the name of the Applicant, which deals with the problem of overheating in urea components and proposes therefore to use at least two resistive heating elements (R1, R2), one of which (R1) is intended for heating one or some (part(s) of) component(s) always in contact with a substantial amount of urea and the other (R2) is intended for heating one or some (part(s) of) component(s) which are sometimes not in contact with a substantial amount of urea, and according to which, when starting the system in freezing conditions, the resistive element R1 is activated but the resistive element R2 is activated only when its component is actually in contact with a substantial amount of urea.

The present invention is advantageously applied to diesel engines, and in particular to the diesel engines of heavy goods or passenger vehicles.

According to an embodiment of the invention, there is a controller for use in an additive delivery system adapted to determine a value representative for the temperature of the additive in the system based on an electrical characteristic of a part inside at least one active component, or the controller of the additive delivery system, wherein said part is further connected to the controller for a different controlling purpose. In that way a controller can use e.g. an existing active component of a prior art system which was previously only used for a particular function, e.g. controlled additive delivery or heating, also for measuring the temperature.

According to another aspect of the invention, there is provided a method for controlling an additive delivery system. An embodiment of the method comprises determining by a controller a value representative of the temperature of the additive in the system based on at least one electrical characteristic of at least one part inside at least one of an active component, or the controller of the additive delivery system; performing other controlling operations involving said part. The electrical characteristic of said at least one part may be a value representative of the resistance of the part and is typically measured inside the controller.

According to a preferred embodiment of the method, the at least one part comprises an electrical wire of an electrical coil of a component. The electrical characteristic can then e.g. be the current or the voltage which can be measured as explained above for embodiments of the system of the invention.

According to a preferred embodiment, one or more electrical characteristics of the at least one part are received from at least one component, such as a level sensor or a pressure sensor. The one or more electrical characteristics are then typically also used for other controlling functions different from the determining by the controller of a value representative for the temperature of the additive in the system.

Some embodiments of the system, controller and method in accordance with the present invention will now be described, by way of example only, and with reference to the accompanying drawings, in which.

Figure 1:
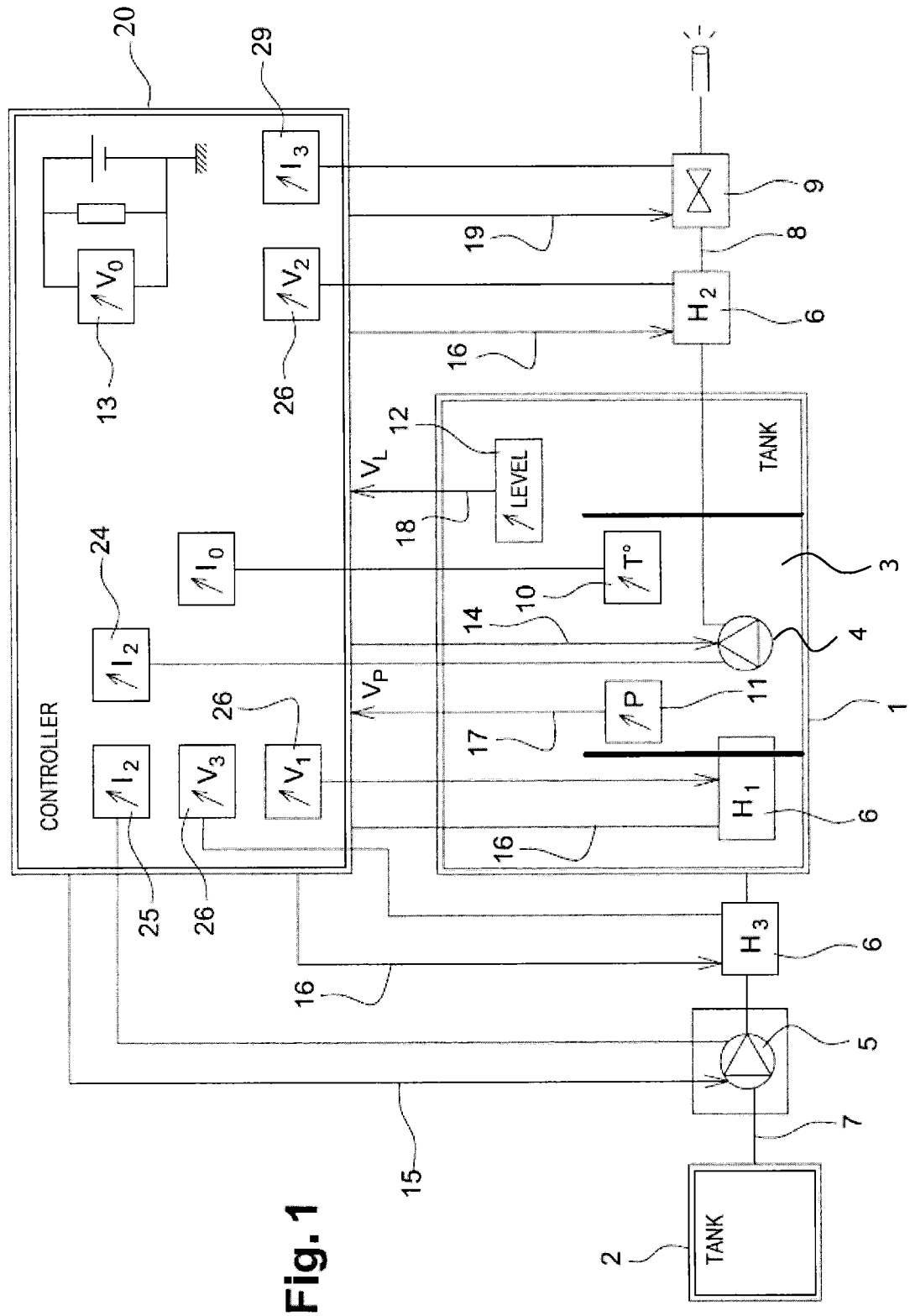
FIG. 1 illustrates schematically a first embodiment of an additive delivery system of the invention.

FIG. 1 illustrates a first embodiment of an SCR system of the invention. This embodiment comprises a main urea tank 1 and a supplementary tank 2, but depending on the available space, the main and supplementary tank could be replaced with a single main tank. The tank 1, 2 is a vehicular fluid tank, such as a tank for holding a urea solution as used in an emission reduction system. The main tank 1 is provided with a compartment 3 containing the main pump 4 for supplying urea solution through line 8 to a dosing device 9. This compartment 3 may further comprise a temperature sensor 10, a quality sensor (not shown), a pressure sensor 11, a pressure regulator (not shown), or similar instruments. Also, the tank 1 may comprise further elements outside this compartment such as a level sensor 12. There is provided a transfer pump 5 between the supplementary tank 2 and the main tank 1 to be able to transfer the urea solution in tank 2 through line 7 to tank 1. There are provided a number of heating elements 6, here indicated as H1, H2, H3 mainly to avoid freezing in the tanks 1, 2 and in the lines 7, 8. Note that the heating element H1 could also consist of two or more separate resistive wires, e.g. one for heating mainly the compartment 3 and one for heating the rest of the tank 1. By placing the active accessory devices 4, 10, 11 within the compartment, the active accessory can be provided with the intended vehicular fluid as soon as the compartment content has reached a sufficiently elevated temperature to ensure liquidity. For example, if the tank is intended for the storage of a eutectic water/urea solution, the compartment content needs to be heated at least up to −11° C., i.e. the melting temperature of such a solution.

Further the system of FIG. 1 comprises a controller 20 connected to the heating elements 6 and to the other components 4, 5, 9, 11, 12 for controlling the operation of those components and/or for receiving information from those components. More in particular the operation of main pump 4 is controlled through line 14, the operation of transfer pump 5 through line 15, the operation of heating elements 6 through lines 16, and the dosing device 9 through line 19. Further the controller receives measurement results VP and VL from the pressure sensor 11 and the level sensor 12, respectively, through lines 17 and 18.

There is provided a temperature sensor 10 for measuring the temperature in tank 1. However, if this temperature sensor is broken, in a system/method of the prior art, it is no longer possible for the controller to perform its normal control functions. This is overcome in the system of FIG. 1 where the controller 20 is adapted to determine a value representative of the temperature of the additive in the system based on one or more electrical characteristics of at least one part inside a heating element 6, inside a component 4, 5, 9, 11, 12 or inside the controller 20 itself, especially if the controller is located near the tank 1. Note that the components 4, 5, 9, 11, 12 all have a further function next to the temperature estimation function in normal operation of the additive delivery system. In other words, a part which is present in those components is given a second function for estimating the temperature of the urea solution.

Figure 3:
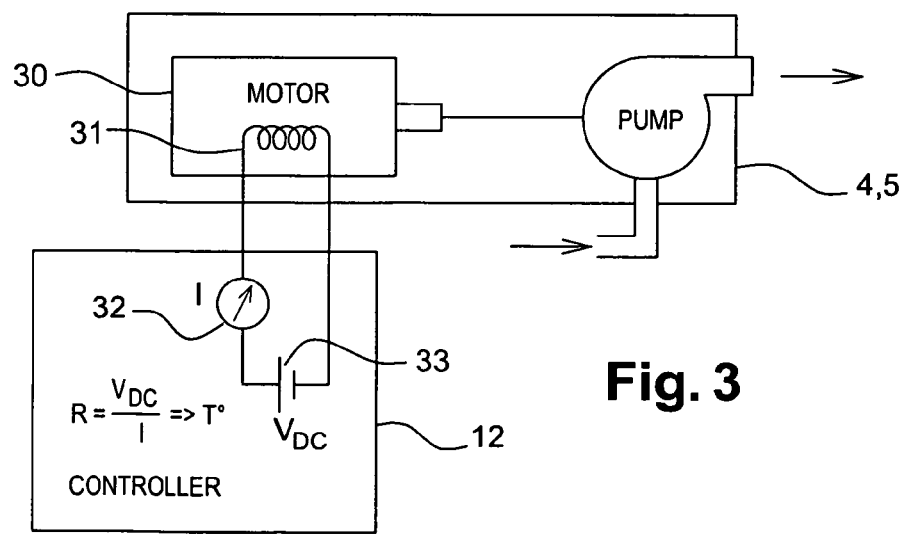
FIG. 3 illustrates in detail an embodiment of a controller of the invention connected to a pump, wherein the normal pump control means have been omitted.
Figure 4:
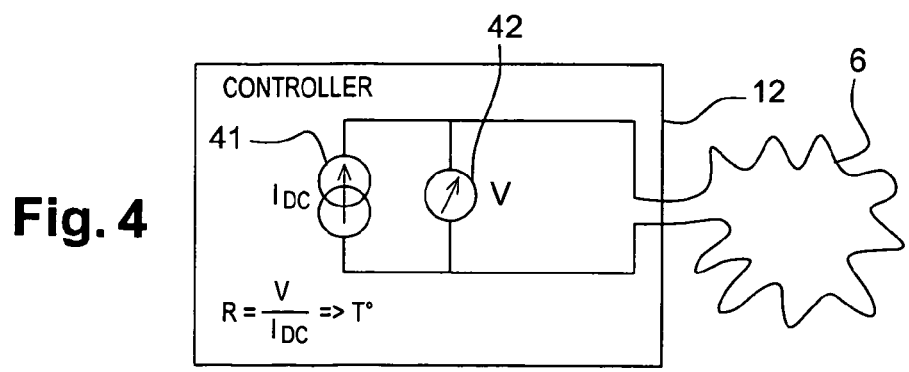
FIG. 4 illustrates in detail an embodiment of a controller of the invention connected to a heating element.
Figure 5:
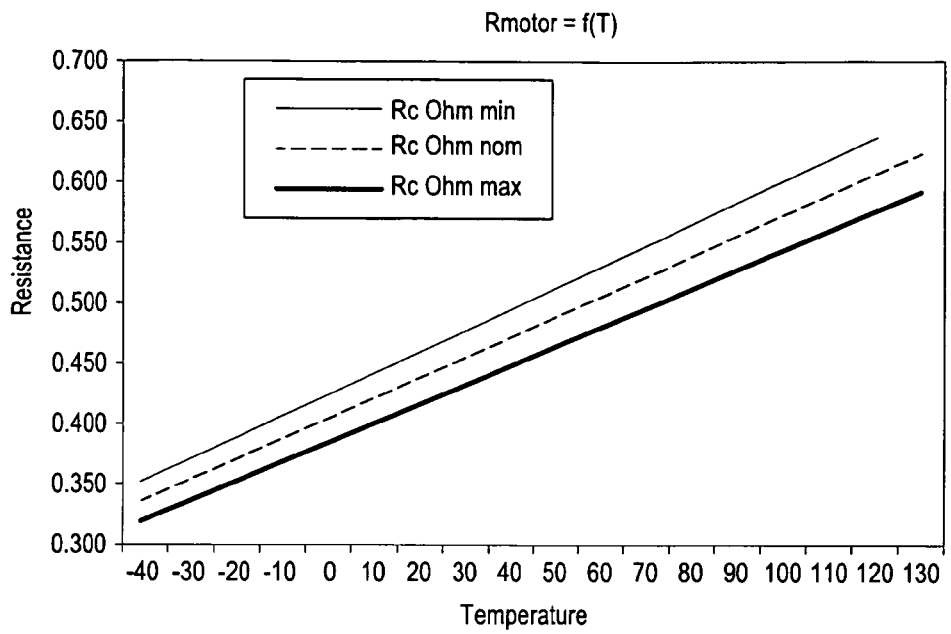
FIG. 5 is a graph illustrating the resistance of the motor coil in function of the temperature.
Figure 6:
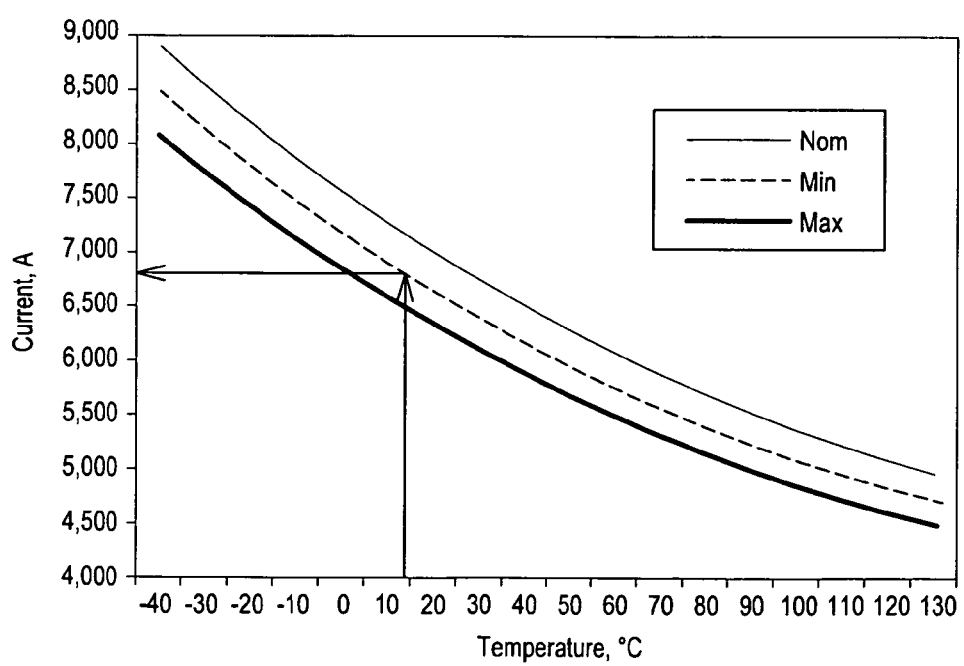
FIG. 6 is a graph illustrating the DC current through the motor coil in function of the temperature.

In the case of the pumps 4, 5 the part to be measured can be a coil wire 31 of an electrical motor 30 of the pump as illustrated in detail in FIG. 3. The controller comprises a voltage source 33 for applying a DC voltage VDC between the terminals of the coil wire 31, and a current measuring device 32 measures the current through the coil wire 31. FIG. 5 illustrates the resistance of the coil wire 31 for a motor with a nominal resistance of 0.44 Ohm at 20° C. in function of the temperature. The resistance varies between 0.319 Ohm at −40° C. to 0.662 Ohm at +130° C. As shown in FIG. 6 a measurement of the current will allow determining the temperature of the coil and hence will give an estimation of the temperature of the fluid in the tank 1. The principle of FIG. 3 can also be applied for valves having an electrical wire and in particular for the dosing device 9 of FIG. 1. In other words the pumps 4, 5, and the dosing device 9 can be used to obtain additional temperature estimations which the controller can use for determining the temperature of the fluid at different locations in the tanks 1, 2 by measuring the current when a DC voltage is applied across an electric wire of those components—see schematic blocks 24, 25, 29 where respective currents I1, I2 and I3 are measured. The skilled person will understand that it is possible to use less components for checking the temperature, and that e.g. only I1 could be measured.

Figure 7:
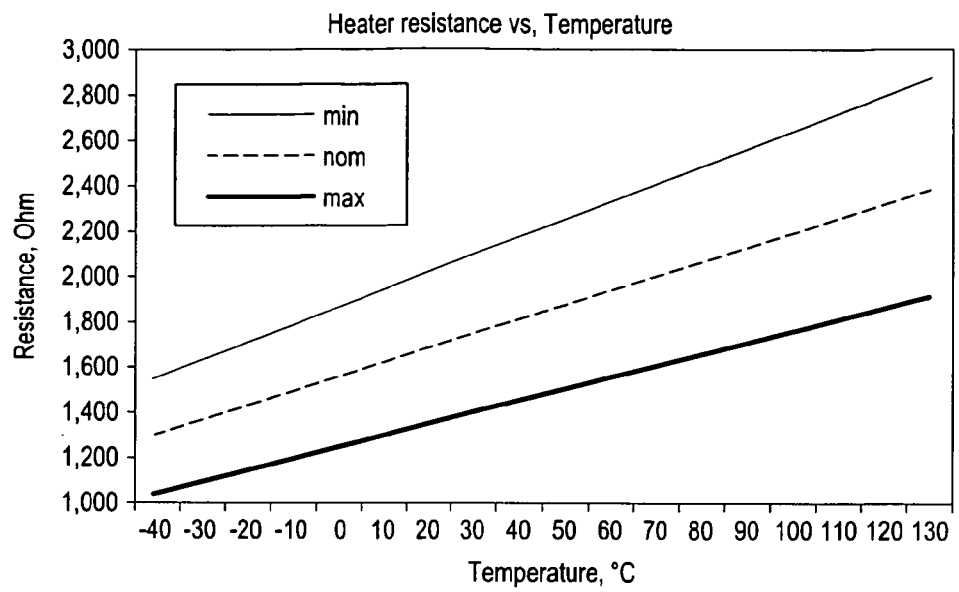
FIG. 7 is a graph illustrating the resistance of a heating element in function of the temperature.
Figure 8:
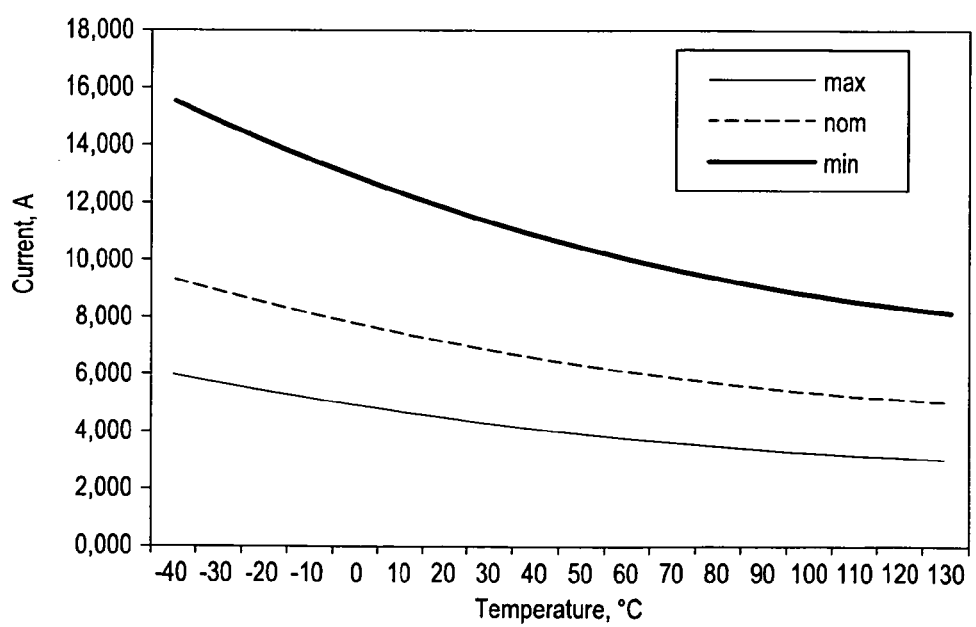
FIG. 8 is a graph illustrating the current through the heating element in function of the temperature.

In the case of a resistive heating element 6, advantageously formed out of a copper-nickel alloy or stainless steel, the controller 20 may be adapted to send a determined current IDC through said wire and to measure a voltage across said wire. In that case the controller 20 comprises a DC current source 41 for sending a current IDC through said wire and a voltage measuring device 42 for measuring the voltage across said wire. Alternatively the controller may be adapted to apply a DC voltage and to measure the current as in the case of the pump example given above. FIG. 7 illustrates the resistance of the resistive wire for a heater with a nominal resistance of 1.69 Ohm at 20° C. in function of the temperature. The resistance varies between 1.034 Ohm at −40° C. to 2.906 Ohm at +130° C. As shown in FIG. 8 a measurement of the current will allow determining the temperature of the resistive wire and hence will provide an estimation of the temperature of the fluid at the location of the heater 6. In other words the heating elements can be used to obtain additional temperature estimations which the controller can use for determining the temperature of the fluid at different locations in the tanks 1, 2 or in the lines 7, 8- see schematic blocks 26 where respective voltages V1, V2 and V3 are measured. The skilled person will of course understand that it is possible to use less heating elements for checking the temperature, and that e.g. only V1 could be measured. Also, the system may comprise more or less heating elements in function of the particularities of the system.

Further it is possible to involve the electrical characteristics VL, VP which the controller receives from the level sensor and pressure sensor for verifying the plausibility of a measurement by the temperature sensor 10. Whether or not the fluid in tank 1 is frozen can be derived out of the electrical characteristics VL, VP. Finally, if the controller is located near the tank 1 or 2, there could be provided a resistor, in particular a thermistor in the controller to measure the temperature at the controller itself, see schematic block 13 in FIG. 1.

By using one or more of the illustrated additional measurements 11-13, V1-V3, V0, VP, VL, the plausibility of the measurement of the temperature sensor 10 may be checked by the controller 20, and the heating of the SCR system may be adjusted by the controller 20 in an improved way. Note that the temperature sensor 10 could even be omitted if sufficient measurements (or at least one reliable measurement) are taken.

Figure 2:
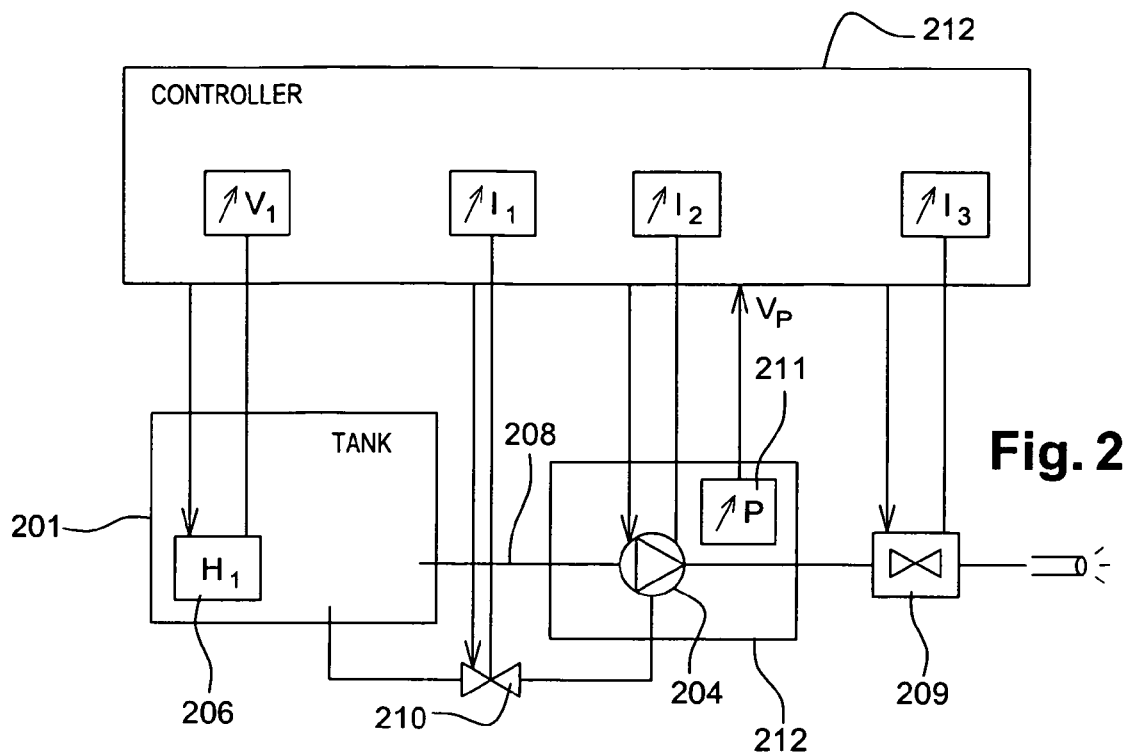
FIG. 2 illustrates schematically a second embodiment of an additive delivery system of the invention.

FIG. 2 illustrates a second embodiment of an addictive delivery system of the invention. This embodiment comprises a tank 201, a pump module 212 with a pump 204 for supplying additive through line 208 to a dosing device 209. This pump module 212 may further comprise a pressure sensor 211, and other instruments (not shown). There is provided a heating element 206, indicated with HI to avoid freezing in the tank 1. Note that the heating element HI could also consist of two or more separate resistive wires. The different components 204, 209, 210, 211 and the heating element 206 are connected to a controller 220. The controller 220 is adapted to determine a value representative of the temperature of the additive in the system based on an electrical characteristic of a part inside a heating element 206 and/or inside a component 204, 209, 210, 211. Note that the components 204, 209, 210, 211 all have a further function on top of the temperature estimation function in normal operation of the additive delivery system. The temperature estimation by the different components can be done in a similar way as explained for FIG. 1 and will therefore not be repeated here.

The invention has been described above in reference to certain exemplary embodiments. These embodiments are intended for illustrative purposes, and do not limit the invention, the scope of which is determined by the enclosed claims.

The invention claimed is:

1. An additive delivery system comprising:
a tank for storing an additive;
an active component; and
a controller connected to the active component,
wherein the controller is adapted to determine a temperature of the additive in the system based on an electrical characteristic of a part inside the active component or inside said controller,
wherein said part has a further function in addition to a temperature estimation function in normal operation of the additive delivery system, and
wherein the active component comprises a pump for pumping additive, said pump having an electrical motor with a coil wire, wherein said part is formed by the coil wire.

2. The additive delivery system of claim 1,
wherein said part is an electrical wire, and
wherein the controller is adapted to apply a determined voltage across said wire and to measure a current through said wire, said measured current being a value representative for the temperature of the additive; or adapted to send a determined current through said wire and to measure a voltage across said wire, said measured voltage being the value representative for the temperature of the additive.

3. The additive delivery system of claim 2,
wherein said controller comprises a DC voltage source for applying the voltage across said wire and a current measuring device for measuring the current through said wire; or
wherein said controller comprises a DC current source for sending a current through said wire and a voltage measuring device for measuring the voltage across said wire.

4. The additive delivery system of claim 1, wherein said additive delivery system is an SCR system.

5. A method for controlling an additive delivery system comprising:

determining by means of a controller, a temperature of an additive in the additive delivery system based on at least one electrical characteristic of at least one part inside at least one of an active component and the controller of the additive delivery system;
performing other controlling operations involving said part,
wherein the active component comprises a pump for pumping additive, said pump having an electrical motor with a coil wire, wherein said part is formed by the coil wire.

6. The method of claim 5, wherein said at least one electrical characteristic is a value representative of a resistance of the part and is measured inside the controller.

7. The method of claim 5, wherein one or more electrical characteristics are received from the active component, and wherein said one or more electrical characteristics are used for other controlling functions different from the determining by the controller of a value representative for the temperature of the additive in the system.

* * * * *